April 2, 1963  R. W. GOTCH  3,084,243
INTERNAL TUBE WELDING TORCH
Filed Feb. 25, 1960  2 Sheets-Sheet 1
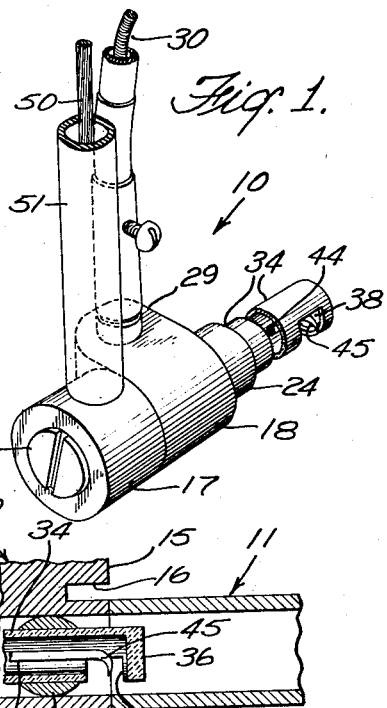
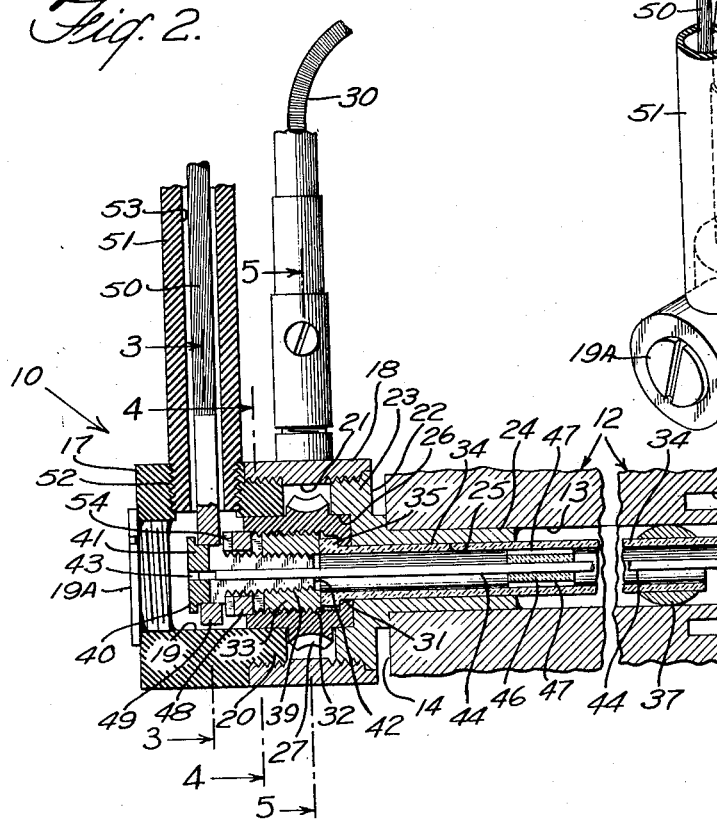
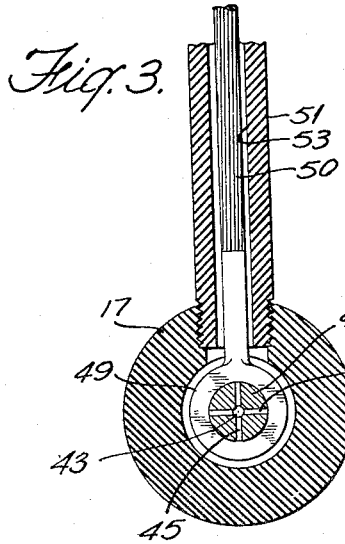
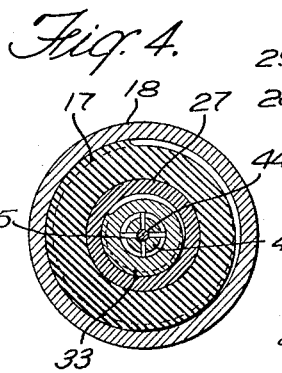
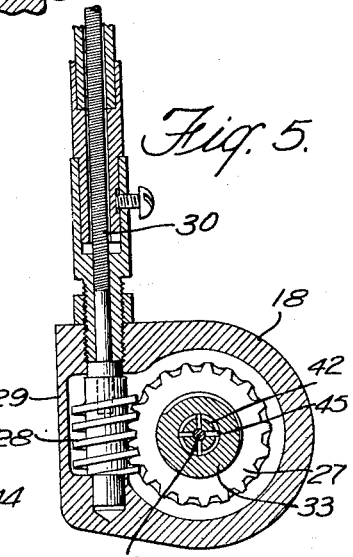
INVENTOR
BY Arthur Frederick
ATTORNEY

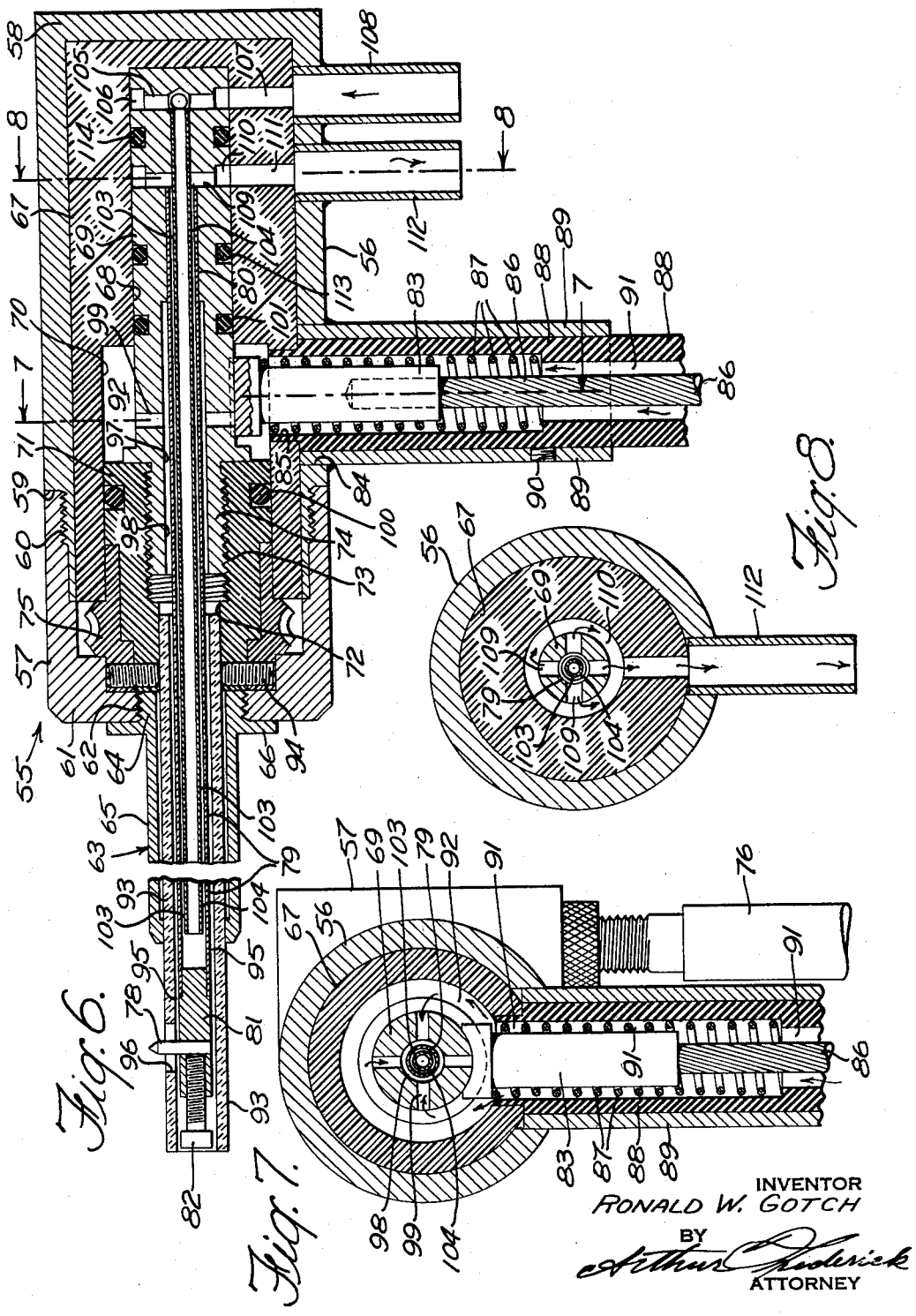

United States Patent Office 3,084,243
Patented Apr. 2, 1963

3,084,243
INTERNAL TUBE WELDING TORCH
Ronald William Gotch, Ashford, England
Filed Feb. 25, 1960, Ser. No. 10,956
3 Claims. (Cl. 219—60)

This invention relates to welding torches and more particularly a welding torch for automatically internally butt welding a tubular member to a support plate or header wall or to another tubular member.

This application is a continuation-in-part of application Serial Number 802,206, filed March 26, 1959, now abandoned.

In the fabrication of heat exchangers wherein heat transfer is effected between a fluid flowing through a plurality of tubular members and a fluid surrounding the exterior of the tubular members, the tubular members are passed through holes provided in the support plates or header walls and the ends are externally butt welded to the outside face of the support plates or header walls. This method of fabrication is not particularly satisfactory since the possibility of leakage is relatively high through the interstices between the outer surfaces of the tubular members and the holes through which they extend.

An obvious alternative method of fabrication to overcome the aforementioned leakage problem is to externally butt weld the tubular members to the inside face of the support plates or header walls. However, this alternative method of fabrication is not practical in the case of a heat exchanger comprising a plurality of tubular members of very small diameters which are arranged in close spaced relationship with each other. With the tubular members arranged in close spaced relationship, the very limited working space available between the tubular members and the relatively great length of the tubular members renders it most difficult to effectively weld the tubular members to the inner face of the support plates or header walls since no welding tool is available which can operate in the small spaces between the tubular members.

Accordingly, it is an object of this invention to provide an automatic welding torch for internally butt welding a tubular member to a support plate or header wall or to another tubular member.

It is another object of this invention to provide an automatic welding torch of the character described which is of simple, compact construction and requiring no support means externally of the members to be welded together.

It is a further object of this invention to provide an automatic welding torch of the character described which is capable of long continuous use without overheating and which is capable of welding thicker elements together than was heretofore possible.

The novel automatic welding torch assembly contemplated by the present invention for internally butt welding a tubular member to another member having a cylindrical opening coextensive with the tubular member comprises a housing and an electrode supported within said housing for rotation. The housing includes means adapted for insertion in the tubular member, or the cylindrical opening which is coextensive with the tubular member, for supporting the entire torch assembly in proper welding position and for locating the electrode coaxially within the members to be welded together and the electrode tip adjacent the point of weld. A means is provided within the housing for rotating the electrode so that the tip thereof scribes a circular path concentric to the end of the tubular member to be welded. Another means is provided for continuously supplying electric current to the electrode as it rotates. The electrode is provided with an electrical shielding means except at the electrode tip so that electrical arcing will only occur from the electrode tip to the point of weld. The welding torch is also provided with means for receiving and supplying an inert gas to the point of weld during the welding operation of the assembly.

In a second embodiment of this invention, the welding torch, in addition to having a housing including means adapted for insertion in a tubular member, or cylindrical opening which is coextensive with a tubular member to be welded, whereby the entire torch assembly is supported in proper welding position, is provided with means for passing cooling fluid therethrough. It has been found that the cooling effect of inert gas is insufficient to prevent the torch and, more particularly, the ceramic shielding parts, from overheating. Overheating of the ceramic shielding elements cause embrittlement of those elements and renders them particularly susceptible to failure. The torch according to this second embodiment, is also provided with a relatively small electrode which is supported at the distal end of an electrode holder at right angles to the longitudinal axis of the torch. Since the electrode is substantially smaller than the electrodes which extend along the longitudinal axis of the torch and are bent adjacent the distal end to provide a tip portion at right angles to the longitudinal axis of the torch, the small electrode represents a saving in the initial cost of the electrode as well as in replacement costs since the tip may be re-ground and replaced in the torch in proper spaced relationship to the point of weld whereas the tips of the electrodes, as above described, cannot be re-ground without changing the spaced relationship of the tip to the point of weld and, therefore, require either a new electrode or repositioning of the entire torch assembly with respect to the point of weld.

The invention will be more clearly understood from the following detailed description thereof when considered in connection with the accompanying drawing wherein two embodiments of the invention are illustrated by way of example and in which:

FIG. 1 is a perspective view of the welding torch assembly according to this invention;

FIG. 2 is a sectional view of the welding torch assembly shown in FIG. 1 but on a larger scale, showing the torch in position for welding;

FIG. 3 is a cross-sectional view taken along line 3—3 of FIG. 2;

FIG. 4 is a view in cross-section taken along line 4—4 of FIG. 2;

FIG. 5 is a cross-sectional view taken along line 5—5 of FIG. 2 showing the means for rotating the electrode;

FIG. 6 is a sectional view of the welding torch assembly according to a second embodiment of the present invention;

FIG. 7 is a view in section taken substantially along line 7—7 of FIG. 6; and

FIG. 8 is a view in section taken substantially along line 8—8 of FIG. 6.

Now referring to the drawings, 10 designates the welding torch assembly according to this invention which is shown in FIG. 2 in a position to butt weld a tubular member 11 to a support plate or header wall 12. As shown, support plate or header wall 12 is provided with a cylindrical opening 13 which extends from the outside face 14 of the wall 12 to the inside face 15 thereof. The diameter of opening 13 is substantially the same as the inside diameter of tubular member 11. An annular groove 16 is milled or otherwise formed in the face 15 of wall 12 spaced from the periphery of opening 13 a distance substantially equal to the thickness of the wall of tubular member 11. The purpose of groove 16 is to provide a mass of material in the header wall substantially equal to the mass of the wall of tubular member 11 in the area adjacent the point of weld so that rate of heating and cooling of the material at the weld will be substantially the same to thereby insure a high strength weld free of defects. Tubular member 11 is suitably supported in coextensive relationship with opening 13 by means, not shown, and with the end to be welded in abutment against the tubular projection formed between opening 13 and groove of header wall 12.

The welding torch assembly 10 comprises a housing consisting of a cylindrical body member 17 of dielectric material, such as Bakelite, and a body member 18. Body member 17 has a central bore 19 and a reduced end portion 20 which is externally threaded. At the opposite end of the body member 17 from its reduced end portion 20, bore 19 is closed by a threaded cap 19A which is of dielectric material, such as Bakelite. Body member 18 is provided with central bore 21 and is internally threaded at opposite ends. Body member 18 is connected at one end to body member 17 by turning the body member 18 upon the threaded end portion 20 of body member 17.

A pilot or centering member 22, having an externally threaded head 23 and a cylindrical, centrally disposed projecting portion 24, is secured to body member 18 by turning head 23 into the mating threads in the end of body member 18. Pilot member 22 has a central bore 25 and a counter-bore portion 26 in the head 23. The projecting portion 24 has an outside diameter which is slightly smaller than the diameter of opening 13 in header wall 12 so that the projecting portion 24 snugly fits therein. A worm gear 27 of dielectric material, such as fluon, and having enlarged hub portions is disposed within body member 18 and between pilot member 22 and body member 17 with the hubs of worm gear 27 snugly disposed in bore 19, adjacent reduced end portion 20, and in the center bore 26 of the head 23 of pilot member 22. As shown in FIG. 5, worm gear 27 is in mesh with a worm 28 which is mounted for rotation within an off-set portion 29 of body member 18. Worm 28 is connected in a conventional manner, as shown, to a flexible drive shaft 30, which shaft is connected at its opposite end to a source of rotary power (not shown). Worm gear 27 has a central bore which is counter-bored to provide a shoulder 31 and is threaded at 32 to receive a threaded bushing 33.

A tubular shield 34 of dielectric material, such as a suitable ceramic, and having a flanged end portion 35 and a distal or closed end portion 36, is disposed with flanged portion 35 between the end of bushing 33 and shoulder 31 of worm gear 27. Bushing 33 is turned into threads 32 of worm gear 27 by inserting a tool into a kerf provided in the end of bushing 33 for that purpose. The threading of bushing 33 into worm gear 27 clamps the flanged portion 35 of shield 34 between the end of bushing 33 and shoulder 31 so that upon rotation of worm gear 27 shield 34 rotates with the worm gear. The outside diameter of tubular shield 34 is of such a dimension that it snugly fits within bore 25 of pilot member 22 but not so tight as to prevent free rotation thereof within the bore. As shown, shield 34 extends substantially beyond the distal end of pilot member 22 and through opening 13 in header wall 12 so that closed end 36 of the shield lies adjacent the end of tubular member 11. To support the tubular shield 34, at its distal or closed end 36, concentrically within opening 13 of the header wall 12, a collar 37 is secured to the periphery of the shield adjacent the closed end 36. The shield is also provided at the closed end 36 with an opening 38 formed in the peripheral wall of the shield. The purpose and function of opening 38 will be discussed hereinafter.

Threaded bushing 33 is provided with a tapered central bore 39 which is threaded to receive therein an electrode holder 40.

Electrode holder 40 comprises a head portion 41 and an integral, tapered shank 42 which is adapted to be turned into threads 39 of bushing 33. A central hole 43 is provided in electrode holder 40, which hole is adapted to receive therein one end of an electrode 44. Electrode 44 is a non-consumable type electrode and may be of tungsten. Shank 42 is divided into a plurality of segments by grooves 45 which extend from the end of shank 42 to a point in head portion 41 so that, when shank 41 is turned into tapered bore 39 of bushing 33, the segments are forced together to clamp electrode 44 therebetween (see FIGS. 4 and 5). The grooves 45 also serve as passageways which communicate at one end with the interior of tubular shield 34 and a chamber formed in bore 19 of body member 17 between cap 19A and worm gear 27. The purpose of the passageways is to provide flow of inert gas, such as argon, from the chamber formed in bore 19 to the interior of tubular shield 34. The source of inert gas and the flow path thereof through the welding torch assembly will be discussed in greater detail hereinafter. With the electrode holder 40 tightly secured in bushing 33, as hereinbefore described, electrode holder 40 will rotate upon rotation of worm gear 37 thereby causing the electrode 44 to rotate about its longitudinal axis.

As shown in FIG. 2, electrode 44 extends from electrode holder 40 through tubular shield 34 to a point adjacent opening 38 in the shield. The distal end of the electrode is off-set from the longitudinal axis of the electrode and projects into opening 38 so that the electrode is provided with a tip 45 which scribes a circular path normal to the longitudinal axis of the electrode upon rotation of the latter. To support electrode 44 coaxially within tubular shield 34 and prevent vibration of the distal or tip end 45 of the electrode, a cylindrical plug 46, of dielectric material and having a diameter slightly smaller than the inside diameter of shield 34 so as to snugly fit within the shield, is secured to electrode 44 at a point adjacent the tip 45 of the electrode. Plug 46 has a centrally disposed hole through which electrode 44 extends and is secured to the electrode by a high temperature ceramic cement. Plug 46 is also provided with a plurality of spaced longitudinal grooves 47 in the outer surface thereof which grooves form with the inner surface of tubular shield 34 a plurality of passageways which allows the flow of inert gas to pass plug 46 as it flows through the tubular shield.

The shank 42 of electrode holder 40 passes through a washer 48 which is disposed and firmly clamped between the head 41 of the electrode holder and bushing 33. Washer 38 defines, with an annular flange on head 41 of the electrode holder 40, an annular groove within which is disposed an electrical contact member 49. Contact member 49 is secured to one end of an electrical cable 50 which is connected at its opposite end (not shown) to a source of electrical power (not shown). Contact member 49 slidably embraces head portion 41 of the electrode holder 40 to provide a continuous flow of electrical current to the electrode 44 as electrode holder 40 rotates. Electrical cable 50 extends coaxially within a conduit 51 which is secured at one end in a threaded opening 52 in body member 17 of the torch housing and at the opposite end is connected to a source of inert gas (not shown). Cable 50 is spaced from the inner surface of conduit 51 to thereby define an annular passageway 53 which communicates with the chamber formed in bore 19 between cap 19A and worm wheel 27. Conduit 51 is constructed of a flexible dielectric material, as for example, polyethylene.

Since gas conduit 51, body member 17, cap 19A, worm gear 27 and tubular shield 34 are constructed of dielectric material, electric-arcing will not occur except between the electrode tip 45 and the point of weld. In addition, the assembly may be handled by an operator when the assembly is in use without fear of electrical shocks since the exterior of the welding torch assembly is completely insulated from the electrical conducting components thereof.

The welding torch assembly 10 is suitably connected to conventional auxiliary equipment (not shown) for simultaneously providing electrical current to electrode 44, rotation of the electrode, and flow of inert gas to and through the welding torch assembly 10. It is also contemplated to provide automatic control units (not shown) which are well known in the art, to synchronize the supply of electrical current and gas, and rotation of the electrode, in proper sequence and duration to insure a high strength, defect free, weld.

In the use and operation of the welding torch assembly 10, herein described, the projecting portion 24 of pilot member 22 is inserted in opening 13 in header wall 12 until the head portion 23 of the pilot member 22 butts against the outer face 14 of the header wall 12. With the pilot member 22 inserted in opening 13, as aforesaid, the entire assembly is supported by header wall 12 and the electrode tip 45 is properly located with respect to the point of weld (where tubular member 11 impinges against header wall 12). After the welding torch assembly 10 is positioned in opening 13, inert gas, such as argon, flows from a source thereof (not shown) through annular passageway 53 formed between electrical cable 50 and gas conduit 51 to the chamber formed in bore 19 of body member 17 by cap 19A and worm wheel 27. From the aforesaid chamber, the gas flows directly into grooves 45 in shank 42 of electrode holder 40 and through radial grooves 54 provided in the top surface of washer 48. The gas thence passes from grooves 45 into the interior of tubular shield 34, through grooves 47 in plug 46, to opening 38 adjacent the closed end 36 of tubular shield 34. The gas is then discharged through opening 38 into opening 13 in header wall 12 and the interior of tubular member 11 so that the area adjacent the point of weld is provided with an inert gas atmosphere.

Simultaneously with flow of inert gas to and through the welding torch assembly 10, electrical current is conducted from a source thereof (not shown) by electrical cable 50 to the electrical contact member 49 and thence to the head portion 41 of electrode holder 40. The electricity thereafter is conducted by head portion 41 to the shank 42 thence from shank 42 to electrode 44. Since header wall 12 is suitably connected to the electric circuit of the welding torch assembly 10, an electric arc between electrode tip 45 to the point of weld will be struck.

Simultaneously with the flow of inert gas and electrical current, electrode 44 is rotated through drive-shaft 30 which is suitably connected to a source of rotary power (not shown). The rotation of drive-shaft 30 rotates worm 28 to which drive-shaft 30 is connected. Since worm 28 is in mesh with worm wheel 27, rotation of worm 28 rotates worm wheel 27. Rotation of worm wheel 27 causes conjoined rotation of bushing 33, electrode holder 40, tubular shield 34, and electrode 44. Coaxial rotation of tubular shield 34 within opening 13 of header wall 12 is insured by bearing collar 37 which is secured to the tubular shield and bears against the peripheral surface of opening 13. Vibration of the tip 45 of electrode 34 is prevented by plug 47 so that the tip 45 is held in a predetermined fixed spaced relationship with the point of weld.

It has been found that excellent results have been achieved by using, in conjunction with the welding torch assembly 10, a removable cover (not shown) which can be fitted over the outside of the joint between header wall 12 and tubular member 11 into which inert gas is supplied to avoid external oxidation of the weld as it is formed. It is preferable to employ a transparent cover so that the progress of the welding operation can be observed.

The welding torch assembly 10 is of such construction that it can be readily adapted for welding tubes of a variety of internal diameters to support plates or header walls of various thickness. To adapt the welding torch assembly 10 to welding a smaller or larger internal diameter tubular member than as illustrated in the drawings, in which case opening 13 in header wall 12 will be of larger or smaller diameter, pilot member 22 is removed from body member 18 and is replaced by another pilot member 22 having a projecting portion 24 selected to snugly fit within opening 13. If the header wall 12 is not as thick or is thicker than the thickness of header wall 12, shown in the drawing, to which tubular member 11 is to be welded, then electrode 44 and tubular shield 34 are removed and replaced by an electrode and a tubular shield of lesser or greater length than that shown so that the electrode tip 45 and opening 38 of the tubular shield 34 lie in proper welding relationship to the joint between tubular member 11 and header wall 12.

Accurate adjustment of the electrode 44 and its tip 45, with respect to the point of weld, can be achieved by removing cap 19A in body member 17, inserting a tool in the kerf 43 of the head portion 41 of electrode holder 40 to loosen the latter in bushing 33, then repositioning electrode 44 within shank 42 so as to bring the electrode tip 45 in the desired position, and thereafter retightening electrode holder 40 in bushing 33 to again tightly clamp electrode 44 in the new position.

The automatic welding torch 55 according to a second embodiment of the present invention, as shown in FIGS. 6, 7 and 8, comprises a housing consisting of a hollow cylindrical body portion 56 and a hollow head portion 57. Body portion 56 is open at one end and closed at the opposite end by a wall 58. Body portion 56, adjacent its open end, is reduced to provide an annular shoulder 59 and is externally threaded at 60. Head portion 57 is open at one end and at the opposite end is closed by a wall 61. Head portion 57 is counter-bored at its open end and internally threaded so that head portion 57 may be connected to body portion 56 by turning head portion 57 on the mating threads 60 of body portion 56, until the open end of the head portion 57 abuts shoulder 59. End wall 61 of head portion 57 is provided with a threaded, axially disposed, opening 62 which is adapted to receive a pilot or centering member 63, which is similar to pilot member 22 of the first embodiment of this invention.

Pilot member 63 is a hollow cylindrical member open at both ends and has an externally threaded head 64 and an integral projecting portion 65. Pilot member 64 is secured to head portion 57 of the torch housing by turning threaded head 64 of the pilot member into the threaded opening 62 in end wall 61 until the annular flange 66 of pilot member 63 abuts end wall 61. Projecting portion 65 has an outside diameter which is slightly smaller than the diameter of opening 13 (FIG. 2) in header wall 12 so that the projecting portion 65 snugly fits within the opening 13.

A cylindrical bushing 67, constructed of dielectric material, such as fluon, ceramic or spauldite, is press fitted within body portion 56 of the housing so that bushing 67 will not move relative to body portion 56. Bushing 67 is provided with a central bore 68 which terminates short of one end and is dimensioned to snugly receive and support for rotation a distributor 69. Bushing 67 is counter-bored at 70 to receive a worm gear bushing 71, which is constructed of a suitable dielectric material, such as fluon. Bushing 71 has a central bore 72 and a threaded counter-bored portion 73. Distributor 69 has a threaded end portion 74 and is secured to bushing 71 by turning threaded end portion 74 into threaded counter-bored portion 73 of bushing 71.

A worm gear 75 is mounted on bushing 71 and secured thereto, as by press fitting bushing 71 in the hub of worm gear 75, to provide conjoined rotation of worm gear 75 and bushing 71. Worm gear 75 is in mesh with a worm (not shown) which is mounted within head portion 57 in the same manner as worm 28 is mounted within body member 18 of the first embodiment (see FIG. 5). The worm is rotatably driven by a flexible cable assembly 76 (FIG. 7) which is connected to head portion 57 and secured to the worm in a conventional manner as shown in FIG. 5 of the first embodiment. The worm gear 75 and bushing 71 are dimensioned to snugly fit within counter-bore 70 of bushing 67, but freely enough to allow rotation of worm gear 75 and bushing 71.

An electrode 78 of the non-consumable type, as for example, tungsten is supported externally of the torch housing by a tubular electrode holder 79 which is secured at one end 80 within distributor 69, and extends in coaxial relationship with the longitudinal axis of distributor 79 and through pilot member 63 to a point beyond the distal end of the latter. The distal end of electrode holder 79 is sealed by a plug 81 which is secured, as by silver soldering to the end portion of electrode holder 79. As shown, electrode 78 is secured in plug 81, at right angles to the longitudinal axis of electrode holder 79, by a set screw 82 threadably receivable in plug 81.

Electrical current is supplied to electrode 78 by means of an electrical contact member 83 which extends through aligned openings 84 and 85 in body portion 56 and bushing 67, respectively. An electrical lead 86 is connected at one end to the shank of contact member 83. Contact member 83 is held in firm electrical contact with the peripheral surface of distributor 69 as the latter rotates by a spring 87 which is disposed around the shank of contact member 83 and bears, at one end, against the head of contact member 83 and at the other end against an internal annular shoulder formed in a tubular conduit 88. Tubular conduit 88 extends through a tubular member 89 which projects into opening 84 in body portion 56 and is welded or otherwise suitably secured to body portion 56. Tubular conduit 88 is constructed of electrical insulating material and is adapted to extend into opening 85 of bushing 67 to electrical insulate bushing 67, body portion 56 and tubular member 89 from contact member 83 and the electrical lead 86. To connect tubular conduit 88 to the torch, a set screw 90 is turned into a threaded opening in tubular member 89. Contact member 83 and electrical lead 86 are dimensioned so that they extend through tubular conduit 88 in spaced relationship with the inner surfaces of the tubular conduit to define with the latter an annular passageway 91. Annular passageway 91 is in communication at one end with a source (not shown) of inert gas and at the opposite end with an annular chamber 92 formed between distributor 69, counter-bore 70 of bushing 67, and bushing 71. Electrical lead 86 is connected to a suitable source of electrical current (not shown) and conducts electrical current to contact member 83 which transmits the current to distributor 69. The electrical current is conducted through distributor 69 to electrode holder 79 at 80, and thence through the electrode holder 79 to plug 81 which transmits the current to electrode 78.

A tubular shield 93 of suitable dielectric material, such as ceramic, similar to tubular shield 34 of welding torch assembly 10, is secured at one end within bore 72 of bushing 71 by two set screws 94, each of which is turned into aligned threaded openings in the hub of worm gear 75 and bushing 71. Tubular shield 93 extends from bushing 71, through pilot member 63, and in coaxial spaced relationship with electrode holder 79 and plug 81 to define with the latter members an annular passageway 95 for the flow of inert gas. Shield 93, adjacent its distal end, is provided with an opening 96, through which electrode 78 projects. Opening 96 is in communication with passageway 95 to provide for flow of inert gas from the latter to the point of weld. Shield 93 electrically insulates electrode holder 79, plug 81 and electrode 78, except for its tip, from pilot member 63 and the members to be welded together.

To provide for flow of inert gas into passageway 95, from the source of inert gas (not shown) through tubular member 89, distributor 69 is provided with an axial bore 97 which extends from one end of the distributor to a point past chamber 92. Bore 97 is of larger diameter than the outside diameter of electrode holder 79 so that an annular passageway 98 is formed between the surface of bore 97 and the outer surface of the electrode holder. As best shown in FIG. 7, passageway 98 is brought into communication with chamber 92 by providing four holes 99 in distributor 69, the holes radially extending through distributor 69 from the outer surface thereof to bore 97. To prevent leakage of gas from chamber 92 through the interstices between the outer surface of bushing 71 and counter-bore 70 of bushing 67, bushing 71 is provided with a peripheral groove in which an O ring seal 100 is placed. Leakage of gas from chamber 92, through the interstices between the outer surface of distributor 69 and bore 68 in bushing 67 is prevented by an O ring seal 101 disposed in a peripheral groove in the outer surface of distributor 69.

To provide for circulation of cooling fluid, such as water, through the torch assembly 55 to prevent overheating thereof during relatively long continuous use, a fluid inlet tube 103 is disposed coaxially within electrode holder 79 and is secured, at one end, as by soldering, within distributor 69. Inlet tube 103 is dimensioned to extend into and through electrode holder 79 to a point in spaced relationship to plug 81. Inlet tube 103 is of smaller outside diameter than the inside diameter of electrode holder 79 so that the outer surface of tube 103 defines with the inner surface of electrode holder 79 an annular cooling fluid passageway 104. The end of tube 103 which is secured within distributor 69 communicates with four radially extending holes 105 provided in the distributor. Each hole 105 communicates with an annular chamber which is defined by the surface of bore 68 of bushing 67 and an annular groove 106 formed in the outer surface of distributor 69. A hole 107 is provided in bushing 69 which hole communicates at one end with annular groove 106 in bushing 67 and at the other end with an inlet connection 108 which is secured, as by welding, within an opening in body portion 56 of the torch housing. A suitable fluid conducting conduit (not shown) is connected at one end to inlet connection 108 and at the other end to a suitable source of cooling fluid (not shown) to deliver cooling fluid to inlet connection 108.

As best shown in FIG. 8, passageway 104 communicates, within distributor 69, with four radially extending holes 109 which are provided in distributor 69. Each hole 109 communicates at one end with a chamber which is defined by the surface of bore 68 and an annular groove 110 provided in the outer surface of distributor 69. A hole 111, similar to hole 107, is provided in bushing 69 to communicate groove 110 with an outlet connection 112 which is secured, as by welding, within an opening in body portion 56 of the torch housing. A conduit (not shown) is suitably connected to outlet connection 112 to receive heated cooling fluid and conduct the same to discharge or to a cooling unit (not shown) where the fluid is cooled and returned for recirculation through welding torch assembly 55.

Leakage of cooling fluid, from grooves 106 and 110 into the interstices between the outer surface of distributor 69 and the surface of bore 68 of bushing 67, is prevented by two O ring seals 113 and 114 each of which is disposed in an annular groove in the outer surface of distributor 69 adjacent each side of groove 110.

In use and operation of welding torch assembly 55, hereinabove described, the projecting portion 65 of pilot member 63 is inserted in opening 13 (FIG. 2) in header wall 12 until flange 66 of pilot member 65 butts against the outer surface 44 (FIG. 2) of header wall 12. With pilot member 65 inserted in opening 13, as above described, the entire torch assembly is supported for welding with electrode 78 properly positioned with respect to the point of weld. After insertion of pilot member 65 in opening 13, as above described, inert gas, as for example argon, is caused to flow from a suitable source thereof (not shown), through annular passageway 91 which is formed in tubular member 88, and past spring 87 into chamber 92. From chamber 92, the inert gas passes through radial holes 99 into annular passageway 98 and thence into annular passageway 95 which is formed between electrode holder 79 and tubular shield 93. The inert gas then flows into and through opening 96, around electrode 78, and thence to the point of weld.

Simultaneously, with the flow of inert gas to and through the welding torch assembly 55, electrical current is conducted from a source thereof (not shown) by electrical lead 86 to contact member 83. Electrical current continuously is transmitted through the head of contact member 83 to distributor 69 as the latter rotates, and is conducted through distributor 69 to electrode holder 79 at 80. The electrical current is conducted by the electrode holder 79 to plug 81 and thence to electrode 78. Since the members to be welded together are suitably connected to the electric circuit of the welding torch assembly 55, an electric arc is struck between the tip of electrode 78 and the point of weld.

Simultaneously with the flow of inert gas and electrical current to electrode 81, electrode 81 is rotated in a circular path in concentric relationship with the point of weld by means of a worm (not shown) mounted for rotation in housing head portion 57, which worm is connected by means of a flexible drive cable assembly 76 to a source of rotary power, not shown. Rotation of the worm is transmitted to worm gear 75 with which it is in mesh. With the rotation of worm gear 75, bushing 71 which is press fitted into the hub of worm gear 75, as well as connected to worm gear 75 by means of set screws 94, is rotated. Since distributor 69 is secured to bushing 71, the distributor is rotated about its longitudinal axis within bore 68 of bushing 67. Rotation of distributor 69 rotates electrode holder 79, plug 81 and inlet tube 103 about their longitudinal axes since the members are secured to the distributor. Since tubular shield 93 is secured to worm gear 75 by means of set screws 75, tubular shield 93 is rotated about its longitudinal axis at the same rate as electrode holder 79 and plug 81 so that opening 96 in tubular shield 96 maintains the same relative position with electrode 78 while the latter is carried in a circular path.

To provide for cooling of the welding torch assembly 55 during its operation, cooling fluid, such as water, flows from a source thereof (not shown) into inlet connection 108, through hole 107, into annular groove 106 in distributor 69. From groove 106, the cooling fluid flows through radial holes 105 and thence into inlet tube 103. The cooling fluid then flows through inlet tube 103 and discharges therefrom into the space between the end of tube 103 and plug 81 and into and back through annular passageway 104. From passageway 104, the cooling fluid flows into radial holes 109 and thence into annular groove 110 in distributor 69. The cooling fluid flows from groove 110 through hole 111 into outlet conduit 112, and then through a suitable conduit (not shown) to a point of discharge or to a cooling unit where the heated cooling fluid is cooled for recirculation through inlet connection 108.

The welding torch 55 may be readily adapted for welding tubes of a variety of internal diameters by removing pilot member 63 from head portion 57 of the torch housing and substituting therefor a pilot member having a projecting portion 65 of the desired outside diameter. Also electrode 78 is either repositioned in plug 81 to place the electrode tip in proper spaced relationship to the point of weld or the electrode is removed and replaced by an electrode having the required length. The welding torch 55 may also be adapted for welding tubes to support plates or header walls of various thickness, by removing pilot member 65 and replacing it with a pilot member having a flange 66 of thicker or thinner dimensions depending upon whether the new header wall is thicker or thinner than the previous header wall to which tubes were welded by the torch.

It is readily apparent from the foregoing description that a welding torch has been provided for internally butt welding a tubular member to another member having an opening coextensive with the tubular member, which welding torch is of relatively simple compact construction, easily fabricated and assembled. It is a welding torch which is capable of welding closely spaced tubular members of exceptionally small diameter to relatively thick support plates or header walls. Furthermore, the welding torch is capable of producing a high strength weld, as distinguished from a seal weld, which is free from defects. In addition to the foregoing, the invention provides according to the second embodiment of the invention a welding torch which is capable of relatively long continuous use without overheating whereby successive welds may be made more rapidly than other welding torches of a similar character.

Although but two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A welding torch assembly for internally butt welding a tubular member to a member having an opening arranged coextensive to said tubular member, said assembly comprising a housing, a distributor disposed and supported for rotation within said housing, means within said housing to rotate said distributor, an electrode holder supported by and connected at one end to said distributor and extending from said housing, an electrode having a tip end portion and secured to and adjacent the distal end of said electrode holder, said housing having a projecting member dimensioned for insertion in one end of the opening in said member to be welded to support the welding torch assembly with the electrode positioned adjacent the point of weld, means for rotating said distributor so that the electrode holder is rotated about its longitudinal axis and the electrode tip end portion scribes a circular path concentric to the tubular member to be welded, a contact member disposed to engage said distributor for supplying electrical current to the latter as the distributor rotates, means for flowing cooling fluid through said welding torch assembly during operation of the torch, and means for electrically insulating the electrode holder and distributor from the housing and the members to be welded together except for the tip end portion of the electrode.

2. A welding torch assembly for internally butt welding a tubular member to a member having an opening arranged coextensive to said tubular member, said assembly comprising a housing, a distributor disposed and supported for rotation within said housing, a tubular electrode holder supported by and connected at one end to said distributor and extending from said housing, said electrode holder being closed at its distal end, an electrode having a tip end portion and secured to and adjacent the distal end of said electrode holder, a pilot member secured to and extending from said housing in coaxial relationship to said electrode holder, said pilot member being dimensioned for insertion into and in relatively tight relationship with one end of the opening in said member to be welded to support the welding torch assembly with the tip end portion of the electrode positioned adjacent the point of weld, means for rotating said distributor within said housing so that the electrode holder is rotated about its longitudinal axis and the electrode tip end portion scribes a circular path concentric to the tubular member to be welded, a contact member disposed to engage said distributor for supplying electrical current to the latter as the distributor rotates, means for electrically insulating the electrode holder and distributor from the housing and the members to be welded together except for the tip end portion of the electrode, a tube disposed coaxially within and in spaced relationship with said electrode holder to define an annular passageway, said tube being connected to said distributor and extending to a point in close spaced relationship with the closed end of the electrode holder so that the interior of the tubular member communicates with said annular passageway, inlet means for providing flow of cooling fluid into and through the interior of said tubular member, and outlet means for receiving heated cooling fluid from said annular passageway and conducting the same from the welding torch assembly.

3. A welding torch assembly for internally butt welding a tubular member to a member having an opening arranged coextensive to said tubular member, said assembly comprising a housing, a distributor disposed and supported for rotation within said housing, a tubular electrode holder supported by and connected at one end to said distributor and extending from said housing, said electrode holder being closed at its distal end, an electrode including a tip end portion secured to and adjacent the distal end of said electrode holder with the longitudinal axis of the electrode extending normal to the longitudinal axis of the electrode holder, a pilot member having a bore therethrough disposed over and in coaxial relationship to said electrode holder, said pilot member being dimensioned for insertion into and in relatively tight relationship with one end of the opening in said member to be welded to support the welding torch assembly with the tip end portion of the electrode positioned adjacent the point of weld, means for rotating said distributor within said housing so that the electrode holder is rotated about its longitudinal axis and the electrode tip end portion scribes a circular path concentric to the tubular member to be welded, a contact member disposed to engage at one end said distributor and at the other end connected to a source of electrical current to supply electrical current to the distributors as the latter rotates, means for electrically insulating the electrode holder and distributor from the housing and the members to be welded together except for the tip end portion of the electrode, a tube disposed coaxially within and in spaced relationship with said electrode holder to define an annular passageway, said tube being connected to said distributor and extending to a point in close spaced relationship with the closed end of the electrode holder so that the interior of the tubular member communicates with said annular passageway, inlet means for providing flow of cooling fluid into and through the interior of said tubular member, and outlet means for receiving heated cooling fluid from said annular passageway and conducting the same from the welding torch assembly.

References Cited in the file of this patent
UNITED STATES PATENTS

| | | |
|---|---|---|
| 2,868,953 | Gardner | Jan. 13, 1959 |
| 2,908,805 | Apblett et al. | Oct. 13, 1959 |
| 2,938,106 | Hawthorne | May 24, 1960 |